(12) United States Patent
Mao et al.

(10) Patent No.: US 11,992,890 B2
(45) Date of Patent: May 28, 2024

(54) ELECTROCHEMICAL DISCHARGE-ASSISTED MICRO-GRINDING DEVICE FOR MICRO-COMPONENTS OF BRITTLE AND HARD MATERIALS

(71) Applicant: Changsha University of Science and Technology, Hunan (CN)

(72) Inventors: Cong Mao, Hunan (CN); Ziyang Chen, Hunan (CN); Yinghui Ren, Hunan (CN); Wei Li, Hunan (CN); Yuanqiang Luo, Hunan (CN); Gang Wu, Hunan (CN); Mingjun Zhang, Hunan (CN); Kun Tang, Hunan (CN); Yongle Hu, Hunan (CN); Feng Shi, Hunan (CN); Weidong Tang, Hunan (CN); Ci Song, Hunan (CN)

(73) Assignee: Changsha University of Science and Technology, Changsha (CN)

( * ) Notice: Subject to any disclaimer, the term of this patent is extended or adjusted under 35 U.S.C. 154(b) by 103 days.

(21) Appl. No.: 17/733,117

(22) Filed: Apr. 29, 2022

(65) Prior Publication Data

US 2023/0321740 A1    Oct. 12, 2023

(30) Foreign Application Priority Data

Mar. 16, 2022    (CN) .......................... 202210255917.0

(51) Int. Cl.
*B23H 5/06*    (2006.01)
*B23H 5/10*    (2006.01)
(Continued)

(52) U.S. Cl.
CPC ................. *B23H 5/06* (2013.01); *B23H 5/10* (2013.01); *B23H 5/12* (2013.01); *B23H 9/008* (2013.01); *B24B 7/228* (2013.01); *B24B 7/24* (2013.01)

(58) Field of Classification Search
None
See application file for complete search history.

(56) References Cited

FOREIGN PATENT DOCUMENTS

| CN | 102220625 A | 10/2011 |
|---|---|---|
| CN | 102373494 A | 3/2012 |

(Continued)

OTHER PUBLICATIONS

English translation CN105215487 (Year: 2016).*

(Continued)

*Primary Examiner* — Stefanie S Wittenberg (57) ABSTRACT

The invention provides an electrochemical discharge-assisted micro-grinding device for micro-components of brittle and hard materials. The device includes a micro-grinding tool, grinding fluid, a workpiece, an auxiliary electrode, a processing groove, and a pulsed DC power supply; the processing groove is filled with grinding fluid; the micro-grinding tool, the workpiece, and the auxiliary electrode are immersed in the grinding fluid; the micro-grinding tool is composed of a conductive grinding tool base, an electroplating layer, and insulated superabrasives. The micro-grinding tool is connected to the negative electrode of the pulsed DC power supply; the grinding fluid is composed of $H_2O_2$, $Na_2CO_3$, EDTA-Fe-Na, and deionized water; the workpiece material is brittle and hard; a large number of micro structures need to be produced on the surface of the workpiece.

2 Claims, 4 Drawing Sheets

(51) Int. Cl.
     *B23H 5/12*     (2006.01)
     *B23H 9/00*     (2006.01)
     *B24B 7/22*     (2006.01)
     *B24B 7/24*     (2006.01)

(56) References Cited

FOREIGN PATENT DOCUMENTS

| | | |
|---|---|---|
| CN | 105215487 A | 1/2016 |
| CN | 107119304 A | 9/2017 |
| JP | 2009178770 A | 8/2009 |

OTHER PUBLICATIONS

English translation JP 2005-329451 (Year: 2005).*
Li et al. "Hybrid micro-grinding process for manufacturing meso/micro-structures on monocrystalline silicon", Materials and Manufacturing Processes, vol. 36, Published online Sep. 3, 2020. (Year: 2020).*
Chen, "Research on high frequency pulse electrochemical discharge precision milling and grinding technology", Thesis for Masters Degree, May 16, 2021; translated. (Year: 2021).*
Haoran Chen, "Study on High-frequency Pulse Electrochemical Discharge Combined Precision Milling and Grinding Technology", May 16, 2021, Shandong University.

* cited by examiner

ELECTROCHEMICAL DISCHARGE-ASSISTED MICRO-GRINDING DEVICE FOR MICRO-COMPONENTS OF BRITTLE AND HARD MATERIALS

CROSS REFERENCE TO RELATED APPLICATION

This application claims priority from the Chinese patent application 202210255855.3 filed Mar. 16, 2022, the content of which is incorporated herein in the entirety by reference.

TECHNICAL FIELD

The present invention relates to the micro-grinding devices, particularly to an electrochemical discharge-assisted micro-grinding device for micro-components of brittle hard and difficult-to-conductive materials.

BACKGROUND ART

Brittle, hard, and difficult-to-conductive materials (such as monocrystalline silicon, monocrystalline silicon carbide, and glass) have the features of high strength, excellent hardness, wear resistance, and difficult-to-conduct electricity. With the continuous development of modern high-tech products towards microminiaturize and precision, ultra-precision three-dimensional micro-components of brittle, hard, and difficult-to-conductive materials are used increasingly in the aerospace, microelectronics, and bioengineering industries. Typical ultra-precise micro-components include microfluidic devices, micro-optical components, and microstructured blades.

The processing accuracy and surface quality of micro components determine their service performance and service life. As materials of the micro components are brittle, hard, and difficult-to-conduct electricity, machining them into micro-components poses great challenges for processing accuracy and efficiency as well as for the surface quality of processing devices. As a result, processing damage, such as chipping, breakage, and micro-cracks often occurs, especially for hard and brittle materials, such as monocrystalline silicon, monocrystalline silicon carbide, and engineering ceramics, due to their high melting point, the processing efficiency is low. Accordingly, it is urgent to develop a new processing device to remove the technical bottleneck of high-efficiency and high-precision machining of micro-components made of brittle, hard, and difficult-to-conductive materials.

The patent titled, Method for Polishing the Inner Wall of the Hole of the Workpiece Made of Hard and Brittle Conductive Materials (with the Publication No: JP1986188024A), aims to improve the processing quality of the inner wall of the hole of the workpiece made of hard and brittle materials. According to the method, the tool and the workpiece are respectively connected to the negative and positive electrodes of the DC power supply and placed in an electrolyte where free abrasive particles are evenly distributed. During machining, the conductive flexible tool serves as the electrochemical cathode, and is revolved and rotated against the hole wall under certain processing pressure. Accordingly, the inner wall of the in-processed hole of the workpiece undergoes electrochemical anodic dissolution and a passive film is generated on the surface. The passive film is removed under the mechanical action of the incoming free abrasive particles when the flexible tool is rotated. This results in the low-damage processing of the inner wall of the hole of the workpiece of hard and brittle materials. Meanwhile, the technical solution also has following features: according to the passivation principle of the workpiece material, the chemical reaction between the workpiece under the electrochemical action and the grinding fluid falls within reactions at room temperature. The heat affected layer (HAL) will not appear during the passivation process, nor will the chemical reaction between the workpiece material and the grinding fluid be expedited due to a thermal effect; as the workpiece serves as an anode for an electrochemical reaction, it must be made of conductive material; since the passivated materials are removed by free abrasives, the processing efficiency is low.

SUMMARY

The invention provides an electrochemical discharge-assisted micro-grinding device for micro-components of brittle hard and difficult-to-conductive materials. The device comprises a micro-grinding tool, grinding fluid, a workpiece, an auxiliary electrode, a processing groove, and a pulsed DC power supply; the processing groove is filled with grinding fluid; the micro-grinding tool, workpiece, and auxiliary electrode are immersed in the grinding fluid; the micro-grinding tool is composed of a conductive grinding tool base, a conductive electroplating layer, and insulated superabrasives. The micro-grinding tool is connected to the negative electrode of the pulsed DC power supply and serves as a cathode; The grinding fluid is composed of $H_2O_2$, $Na_2CO_3$, EDTA-Fe-Na, and deionized water and is electrically conductive; the workpiece is made of brittle, hard and difficult-to-conductive materials; a large number of microstructures need to be produced on its surface. The workpiece is placed adjacent to the micro-grinding tool. The auxiliary electrode composed of a large block of inert conductive material, and connected to the positive electrode of the pulsed DC power supply to serves as an anode. The size of the auxiliary electrode is larger than that of the micro-grinding tool by one to two orders of magnitude. When the current of the pulsed DC power supply flows through the loop, hydrogen bubbles are generated around the micro-grinding tool due to an electrochemical reaction. A gas film is generated as hydrogen bubbles converge and merge. Under the action of a strong electric field, the gas film is broken down and electrochemical discharge occurs accompanied by discharge spark. The discharge spark directly ablates the adjacent workpiece and generate a softened HAL, namely, physical modification of the surface material of the workpiece; meanwhile, the discharge spark increases the temperature of the adjacent workpiece and the grinding fluid. This causes a chemical reaction between the workpiece and the grinding fluid to generate soft oxysalt, namely, chemical modification of the surface material of the workpiece; the mechanical properties of the modified layer generated under the coupled physical and chemical modification are significantly reduced so it can be ground away by the micro-grinding tool rapidly and efficiently. This achieves high-efficiency, high-precision, and high-quality machining of the workpiece made of brittle, hard and difficult-to-conductive materials; moreover, a large number of microstructures of flow channels can be produced on the surface of the workpiece, in conjunction with the movement of the workbench.

The working portion of the micro-grinding tool may have a needle-, rod-, disc-, column-like, or spherical shape. The radial dimensions of the working portion range from 0.02 mm to 1 mm; the micro-grinding tool is immersed in the grinding fluid at an immersion depth ranging from 0.5 mm to 2 mm; the electroplating layer covers the whole or part of the working surface of the micro-grinding tool, and its thickness ranges from 0.5 μm to 100 μm; the superabrasives are diamond and cubic boron nitride (CBN), and their particle sizes range from 0.5 μm to 50 μm.

Hard, brittle, and difficult-to-conductive materials include monocrystalline silicon, polycrystalline silicon, monocrystalline silicon carbide, polycrystalline silicon carbide, glass, and engineering ceramics.

The large block of inert conductive material of the auxiliary electrode is bulk graphite.

The inner space of the processing groove can accommodate the workpiece and the auxiliary electrode at the same time; the groove depth allows the immersion of the to-be-machined surface of the workpiece in the grinding fluid and is 2 mm or more above the to-be-machined surface.

The electrochemical discharge-assisted micro-grinding device for micro-components of brittle hard and difficult-to-conductive materials, as disclosed by the invention, has the following beneficial effects.

① It has strong adaptability for brittle, hard, and difficult-to-conductive materials. The electrochemical discharge generated by the micro-grinding tool doesn't rely on the workpiece material; moreover, the removal mode of the workpiece material is to utilize the electrochemical discharge to promote the physical and chemical modification of the surface material of the workpiece at first, then use the mechanical action of the micro-grinding tool to remove the modified layer, so the device can be widely used in the processing of hard and brittle materials that are difficult-to-conduct electricity and have high-melting point, such as monocrystalline silicon, monocrystalline silicon carbide, and engineering ceramics.

② Achieved both processing accuracy and efficiency at the same time. The surface material of the workpiece in the electrochemical discharge-affected region is modified by the physical and chemical coupling to produce a modified layer with significantly reduced mechanical properties. When the ultra-fine abrasive particles on the micro-grinding tool scratch the workpiece, the modified layer is removed easily and quickly, so that the machined surface can reach nano-scale roughness; the processing efficiency is significantly improved when a greater grinding depth can be used at the same grinding speed than single forms of micro-grinding; the rapid removal of the modified layer on the workpiece allows the micro-grinding tool to concentrate on the elimination of small amounts of hard and brittle base material, meanwhile, it reduces the mechanical grinding force between the micro-grinding tool and the workpiece, that improving the shape retention of the micro-grinding tool and also further increases the dimensional and shape accuracy of the micro structures in the workpiece.

③ Improving the processing quality of micro-components. As the modified layer is on the surface of the workpiece, only a small amount of unmodified hard and brittle base material is removed by the micro-grinding tool, which effectively increases the maximum undeformed chip thickness of the brittle-ductile removal transition at low grinding speed. It enables a smooth removal in ductile domain of the hard and brittle materials workpiece and reduces processing damage to micro-components.

④ The wear evolution of the micro-grinding tool slows down. The modified layer generated under coupled effects of physical and chemical modification has good processing performance, which reduces the mechanical force of the micro-grinding tool during grinding. It significantly reduces the probability of wear, breakage, and shedding of superabrasive particles and slows down the wear evolution rate of the micro-grinding tool. Moreover, the shape retention and service life of the micro-grinding tool are improved.

⑤ The grinding performance of the micro-grinding tool is more stable. When an electrochemical discharge ablates the workpiece, the electroplated base layer on the working surface of the micro-grinding tool is also slightly ablated. The micro-grinding tool can achieve self-sharpening, that is, maintains a sharp state suitable for grinding and achieve a more stable grinding performance.

Description of reference numerals in the drawings: 1. Micro-grinding tool; 1-1. Grinding tool base; 1-2. Electroplating layer; 1-3. Superabrasive; 2. Grinding fluid; 3. Workpiece; 3-1. Micro structure; 4. Auxiliary electrode; 5. Processing groove; 6. Pulsed DC power supply; 7. Gas film; 8. Discharge spark; 9. Hydrogen bubble; 10. Modified layer; 10-1. HAL; 10-2. Oxysalt.

DETAILED EMBODIMENT

The device of the present invention is further described by specific examples in conjunction with the accompanying drawings below.

Figure 1:
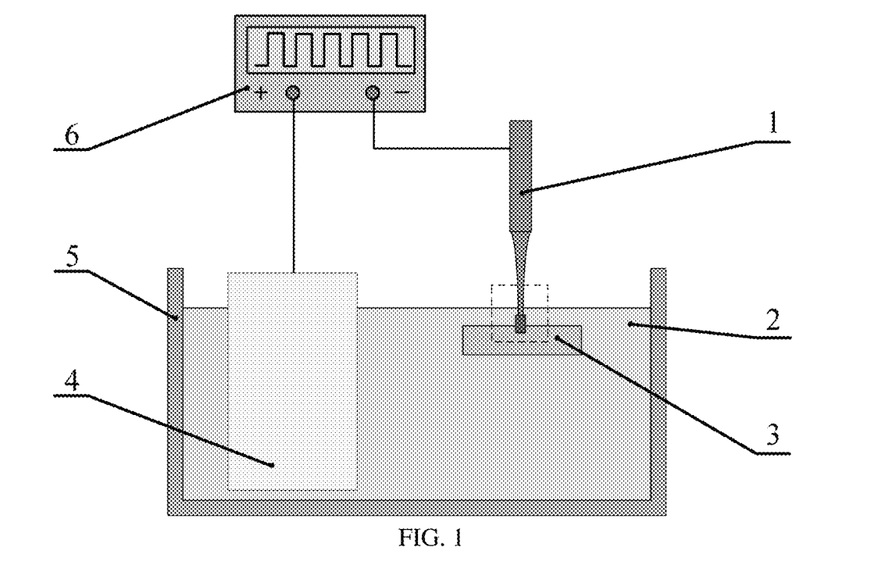
FIG. 1 is a schematic diagram of an electrochemical discharge-assisted micro-grinding device for micro-components of brittle hard and difficult-to-conductive materials, as stated in the present invention.
Figure 2:
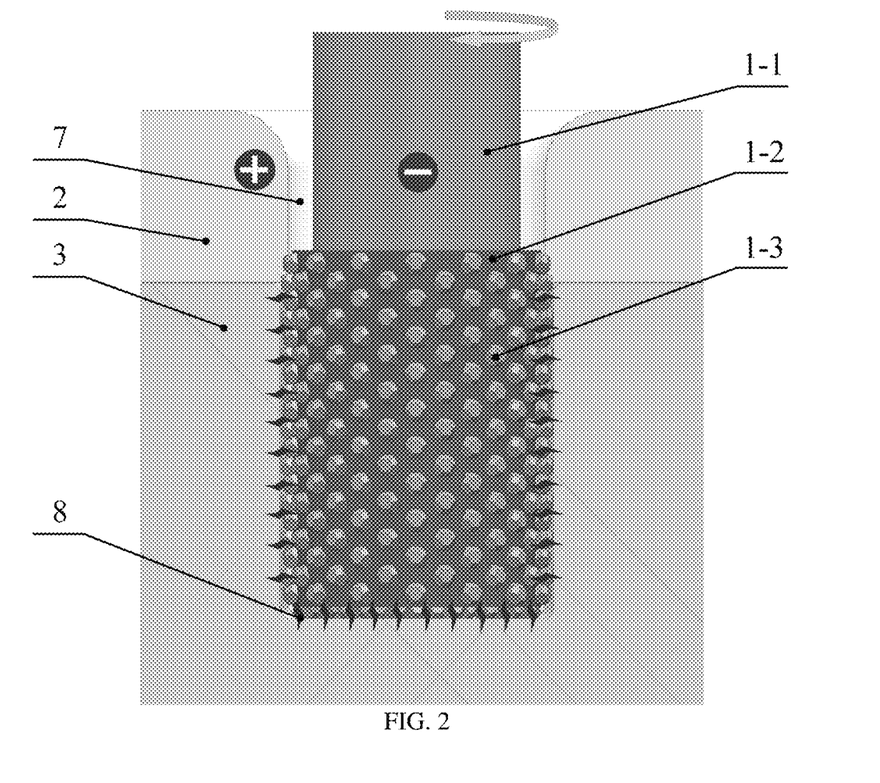
FIG. 2 is a partially enlarged view of the grinding head portion of the micro-grinding tool in FIG. 1.

An electrochemical discharge-assisted micro-grinding device for micro-components of brittle hard and difficult-to-conductive materials. The structure of the device is shown in FIGS. 1 and 2 and includes six parts: the micro-grinding tool (1), the grinding fluid (2), the monocrystalline silicon carbide (SiC) workpiece (3), the auxiliary electrode (4), the processing groove (5) and the pulsed DC power supply (6). The constituents and structure of each part are presented as follows.

The tungsten material micro-rod is used as the grinding tool base (1-1) of the micro-grinding tool (1), the micro-rod has a slender shank (length: 30 mm; diameter: Φ3 mm) and a minute tool bit (length: 8 mm; diameter: Φ0.45 mm). Between the shank and the tool bit, a transitional cone (length: 10 mm) with gradually reducing diameters is used to improve the structural strength of the tool bit. At the end of the tool bit, electroplating technology is employed to coat the diamond abrasives (1-3) with a particle size of 1,000 mesh in an electroplated nickel layer (1-2) with a length of around 4 mm and a thickness of 0.025 mm on single side. The tool bit coated with the abrasive grain layer is used as the grinding head, i.e. the working portion of the micro-grinding tool (1).

The mass fractions of each component in the grinding fluid (2) are set according to the chemical reaction conditions of monocrystalline SiC, including 68 wt % deionized water, 16 wt % $Na_2CO_3$, 10% $H_2O_2$, and 6% EDTA-Fe-Na. The $Na_2CO_3$ powder is not deliquescent; the 30 wt % $H_2O_2$ reagent is selected; during preparation of the grinding fluid (2), the $Na_2CO_3$ powder is added into the deionized water, stirred well, and used as the base solution. Then the $H_2O_2$ is injected as the oxidant into the base solution. The EDTA-Fe-Na powders are added as a catalyst and stirred until they are completely dissolved. The preparation of the grinding fluid (2) is thus completed. The 1 kg grinding fluid (2) is prepared for future use according to the requirements of the device.

The monocrystalline SiC workpiece (3) is a single block with a size of 15 mm×10 mm×2 mm. It is featured by high hardness, high brittleness, and a high melting point, and difficult-to-conduct electricity; the auxiliary electrode (4) is a bulk of graphite with a size of 40 mm×20 mm×5 mm, which has good electrochemical stability and is resistant to the corrosion of alkaline working fluid; the processing groove (5) is a Polytetrafluoroethylene (PTFE) (PTFE) plastic groove with an internal size of 50 mm×50 mm×30 mm and a wall thickness of 5 mm. Four through-holes (diameter: Φ0.8 mm) are drilled at the bottom of the groove for connection and fixation. The PTFE plastic has great resistance to strong alkali and so it can resist the chemical erosion of grinding fluid (2). The pulsed DC power supply (6) of the transistor type is employed, which has good pulse waveform and low cost; the adjustable range of its output voltage is 0 V-100 V, and the maximum peak current is 30 A.

The relative position of each part of the device is as follows: the grinding fluid (2) with a depth of 22 mm is injected into the processing groove (5); the micro-grinding tool (1), the monocrystalline SiC workpiece (3), and the auxiliary electrode (4) are placed in the processing groove (5). The immersion depth of the grinding head portion of the micro-grinding tool (1) in the grinding fluid (2) is 1.5 mm; the monocrystalline SiC workpiece (3) and the auxiliary electrode (4) are completely immersed in the grinding fluid (2), the upper surface of the monocrystalline SiC workpiece (3) is adjacent to the grinding head of the micro-grinding tool (1); the micro-grinding tool (1) is connected to the negative electrode of the pulsed DC power supply (6) and serves as an electrochemical cathode; the auxiliary electrode (4) is connected to the positive electrode and serves as an electrochemical anode.

Figure 3:
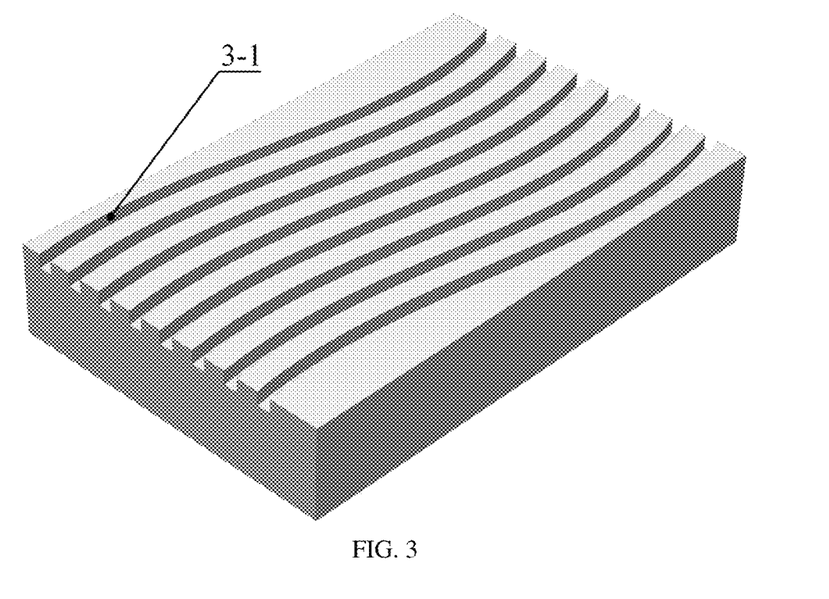
FIG. 3 is a schematic diagram of the workpiece used in a specific example of the electrochemical discharge-assisted micro-grinding device for micro-components of brittle hard and difficult-to-conductive materials, as stated in the present invention.

As shown in FIG. 3, this example aims to show the production of eight micro structures (3-1) (0.5 mm wide and 20 μm deep) of flow channel on the surface of the monocrystalline SiC workpiece (3), using the aforesaid device. Since the precise feeding and rotation of external sources are required by the device during processing, the micro-grinding tool (1) in the device is clamped on the spindle of the machine tool used for micro-machining, and a special clamp is used to locate and to clamp the monocrystalline SiC workpiece (3); bolts are used to fix the clamp together with the processing groove (5) on the workbench of the machine tool. The high-speed rotation of the micro-grinding tool (1) and the precise feeding between the micro-grinding tool (1) and the monocrystalline SiC workpiece (3) are achieved using the precision machine tool.

Figure 4:
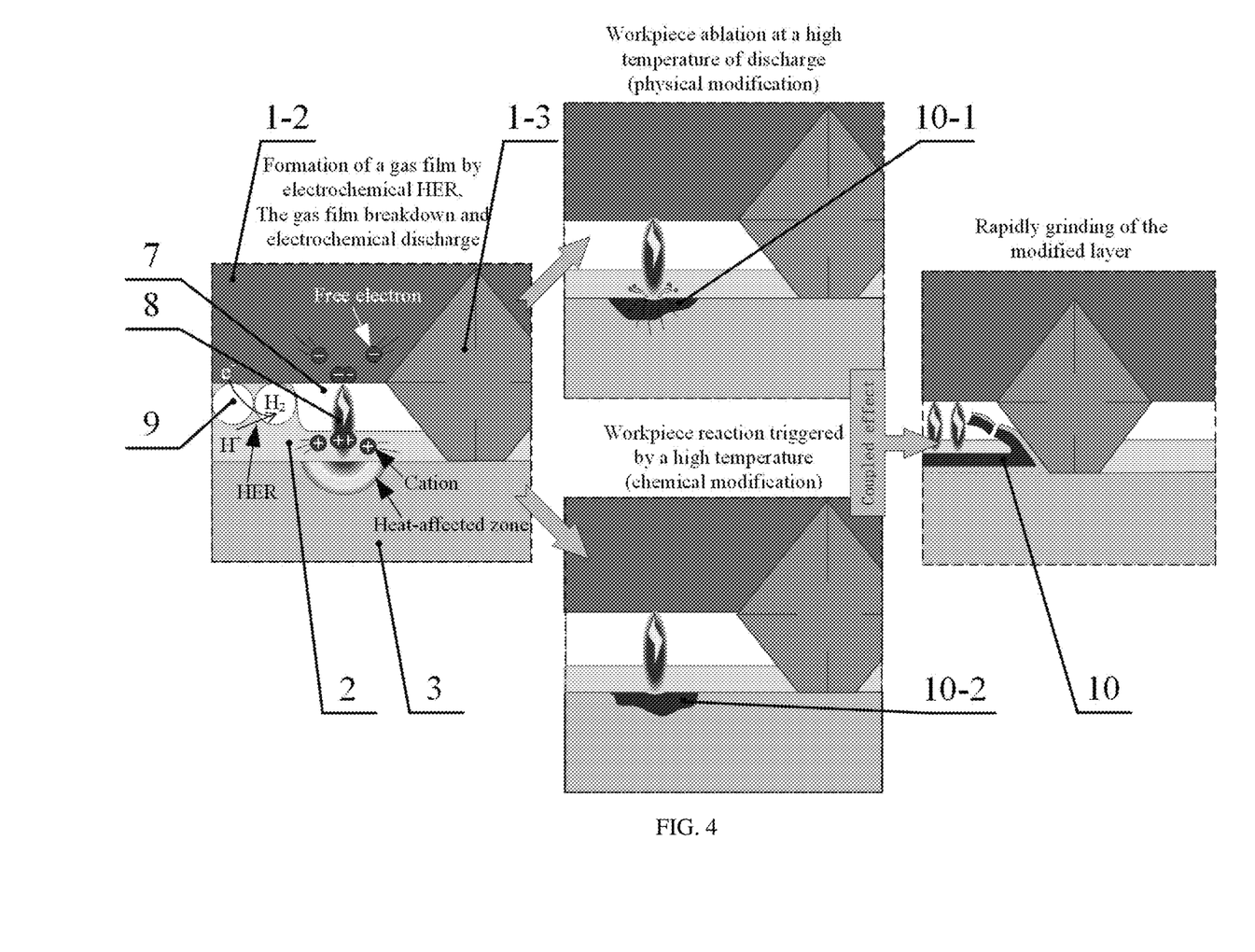
FIG. 4 is a schematic diagram of the processing principle of the electrochemical discharge-assisted micro-grinding device for micro-components of brittle hard and difficult-to-conductive materials, as stated in the present invention.

The spindle speed of the machine tools used for micro-machining is set to 60,000 r/min, the feeding rate to 500 μm/min, and the grinding depth to 5 μm; the pulse width of the pulsed DC power supply (6) is set to 60 μs, the duty cycle to 0.2, and the peak voltage to 40 V. The operation process of each part of the device during machining is as follows:

When the current provided by the pulsed DC power supply (6) flows through the loop, an electrochemical reaction occurs to the portion of the micro-grinding tool (1) immersed in the grinding fluid (2). An insulating gas film (7) is generated around the micro-grinding tool (1), as multiple hydrogen bubbles (9) converge and merge. Since the auxiliary electrode (4) is much larger than the micro-grinding tool (1), oxygen bubbles are constantly produced by the electrochemical reaction in the grinding fluid (2); under the action of the voltage provided by the pulsed DC power supply (6), the gas film (7) is broken down by the micro-grinding tool (1), the electrochemical discharge occurs accompanied by the discharge spark (8); since the discharge spark (8) has a local, instantaneous, and strong thermal effect, during electrochemical discharge, the micro-grinding tool (1) can directly ablate the adjacent monocrystalline SiC workpiece (3) leading to the generation of the softened HAL (10-1), namely, physical modification of the surface material of the monocrystalline SiC workpiece (3); meanwhile, The micro-abrasive tool (1) also increases the temperature of the monocrystalline SiC workpiece (3) and of the grinding fluid (2) adjacent to its discharge area. The increase in temperature causes a chemical reaction between the monocrystalline SiC workpiece (3) and the grinding fluid (2). During the reaction, soft silicate (10-2) is produced, namely, chemical modification of surface material of the monocrystalline SiC workpiece (3); during electrochemical discharge, the electroplated nickel layer (1-2) on the working surface of the micro-grinding tool (1) is slightly ablated, and the micro-grinding tool (1) can achieve self-sharpening to ensure a sharp state suitable for grinding and a stable performance. When the pulsed DC power supply (6) enters the pulse interval, the electrochemical discharge on the micro-grinding tool (1) stops. The ruptured gas film (7) causes the grinding fluid (2) to resume contact with the micro-grinding tool (1). The grinding fluid (2) flow cools the micro-grinding tool (1) and the monocrystalline SiC workpiece (3) while discharge the product of ablation. The electrochemical discharge generated by the micro-grinding tool (1) doesn't rely on the material of the workpiece (3), and the electrochemical discharge is used mainly to trigger the modification of the workpiece (3) material, rather than the erosion of the material. Therefore, the device is highly adaptable to the processing of the monocrystalline SiC, that is difficult-to-conduct electricity and has a high gasification temperature, and of other hard and brittle materials with similar characteristics.

The mechanical properties such as hardness, elastic modulus, and tensile strength of the modified layer (10) of the monocrystalline SiC workpiece (3) generated under the coupled effects of physical and chemical modification are significantly reduced. Accordingly, the modified layer (10) has better cutting performance; when the micro-grinding tool (1) is rotated at a high speed and fed precisely, the modified layer (10) of the monocrystalline SiC workpiece (3) can be quickly removed by the diamond abrasive (1-3) on the micro-grinding tool (1) that scratch the layer. This enables the performance of the micro-grinding tool (1) to be more concentrated in removal of small amounts of hard and brittle monocrystalline SiC base materials, while weakening the mechanical force between the diamond abrasive (1-3) and the monocrystalline SiC workpiece (3). It slows down the wear evolution speed of the micro-grinding tool (1). Meanwhile, the shape retention of the micro-grinding tool (1) and the shape accuracy of the micro structures (3-1) of flow channel are improved. As only a small amount of the unmodified monocrystalline SiC workpiece (3) materials are removed by the micro-grinding tool (1), the critical depth of cuts for the brittle-ductile removal transition of the micro-grinding tool (1) increases at the same grinding speed, thus, it is easier to achieve the removal in ductile domain when grinding monocrystalline SiC workpiece (3). This can reduce or even eliminate processing damage to the surface/subsurface and processing defects, such as chipping, breakage, and cracking. Meanwhile, the elimination of the modified layer (10) by the ultra-fine diamond abrasives (1-3) also enables the micro structures (3-1) of the flow channel to have nano-scale surface roughness after processing. The micro-grinding tool (1) repeats the aforesaid process of electrochemical discharge-assisted modification and grinding. Based on feeding of the workbench in the preset machining path, micro structures (3-1) of the flow channel are finally produced on the surface of monocrystalline SiC workpiece (3).

According to the foregoing structure and its working process, the device realizes high-efficiency, high-precision, and low-damage machining of the micro structures (3-1) of the flow channel on the surface of a monocrystalline SiC workpiece (3). Regulating parameters of the micro-grinding tool (1) and the other aforesaid structures is applicable to machining of all kinds of hard and brittle materials that have high melting points and difficult-to-conduct electricity. It effectively resolves defects of the existing methods for processing micro-components of hard and brittle materials that have high melting points and are difficult-to-conduct electricity.

The specific description of the foregoing embodiment is only intended to elaborate the present invention explicitly, not to limit the scope of the present invention. Any equivalent replacement and modification etc. made within the scope of the present invention are in the protection scope of the invention.

The invention claimed is:

1. An electrochemical discharge auxiliary fine grinding device for tiny parts of hard and brittle material, wherein the device comprises a micro-grinding tool (1), a grinding liquid (2), a work piece (3), an auxiliary electrode (4), a processing groove (5) and a pulsed direct current power supply (6); the grinding liquid (2) is filled in the processing groove (5);

the micro-grinding tool (1), the work piece (3) and the auxiliary electrode (4) are soaked in the grinding liquid (2);

the micro-grinding tool (1) is composed of a conductive grinding tool base body (1-1), a conductive electroplating layer (1-2) and an insulating hard abrasive material (1-3), wherein the conductive grinding tool base body (1-1) is a tungsten rod with a shank diameter of 5 mm and a grinding head diameter of Φ0.45 mm, the conductive electroplating layer comprises a 25 μm thick electroplating nickel layer (1-2) containing the insulating hard abrasive material which comprises diamond abrasives (1-3) on the grinding head; and the diamond abrasives (1-3) have a particle size of 1,000 mesh;

the micro-grinding tool (1) is connected with a negative electrode of the pulsed direct current power supply (6);

wherein the grinding liquid (2) consists of 68% deionized water, 16% $Na_2CO_3$, 10% $H_2O_2$, and 6% EDTA-Fe-Na and is electrically conductive;

a material of the work piece (3) is hard and brittle, which is used to produce a large amount of micro-structure (3-1) on the surface of the work piece (3), the auxiliary electrode (4) is composed of graphite, in connection with a positive electrode of the pulsed direct current power supply (6), and the size of the auxiliary electrode (4) is larger than that of the micro-grinding tool (1) by one to two orders of magnitude and the work piece (3) is a block of monocrystalline silicon carbide (SiC) with a dimension of 5 mm×5 mm×2 mm; and the work piece (3) has a high melting point material;

the work piece (3) made of the monocrystalline silicon carbide is located adjacent to and surrounding the micro-grinding tool (1);

the auxiliary electrode (4) is connected to the positive electrode of the pulsed direct current-power supply (6) to serve as an anode;

wherein when a current of the pulsed direct current power supply (6) passes through a loop, the micro-grinding tool (1) will generate hydrogen bubbles (9) due to electrochemical reaction, hydrogen bubbles (9) forms an air film (7), the air film (7) is broken down to generate electrochemical discharge and discharge spark (8) under an electric field effect, the discharge spark (8) directly ablates the work piece (3) near the discharge spark (8) and forms a softened thermal layer (10-1)-to have a physical modification of a surface of the work piece (3); the discharge spark (8) slightly ablates the electroplating layer (1-2) of the working surface of the micro-grinding tool (1); the micro-grinding tool (1) achieves self-sharpening and maintains a sharp state suitable for grinding and the device can be used for processing the work piece (3) made of the monocrystalline silicon carbide; the discharge spark (8) makes the temperature of the work piece (3) and the temperature of the grinding liquid (2) near the work piece (3) rise, so as to promote a chemical reaction between the work piece (3) and the grinding liquid (2), generating an oxysalt (10-2), including a chemical modification of the surface of the work piece (3);

and a modified layer (10) that is generated under a coupling of the physical modification and the chemical modification can be quickly and efficiently grinded by the micro-grinding tool (1), so as to realize high quality and high precision processing of the work piece (3), a number of microstructures (3-1) can be processed on the surface of the work piece (3);

the modified layer (10) reduces the mechanical force of the micro-grinding tool (1) and a wear evolution rate of the micro-abrasive tool (1) is slowed down, and shape retention and service life of the micro-abrasive tool (1) are improved, while a dimensional accuracy and shape accuracy of the microstructure (3-1) on the work piece (3) are enhanced.

2. The electrochemical discharge auxiliary fine grinding device for tiny parts of hard and brittle material according to claim 1, wherein the shape of a working part of the micro-grinding tool (1) is needle-shaped, rod-shaped, spherical, disc-shaped, column-shaped, the radial size range of the working part is 0.02 mm to 1 mm; an immersion depth range of the micro-grinding tool (1) in the grinding liquid (2) is 0.5 mm to 2 mm; the electroplating layer (1-2) covers all or part of a working surface of the micro-grinding tool (1) and a thickness range of the electroplating layer (1-2) is 0.5 microns to 100 microns.

\* \* \* \* \*